Oct. 16, 1962 H. HENSS 3,059,230
SPEED WARNING DEVICE FOR MOTOR VEHICLES
Filed Dec. 7, 1959
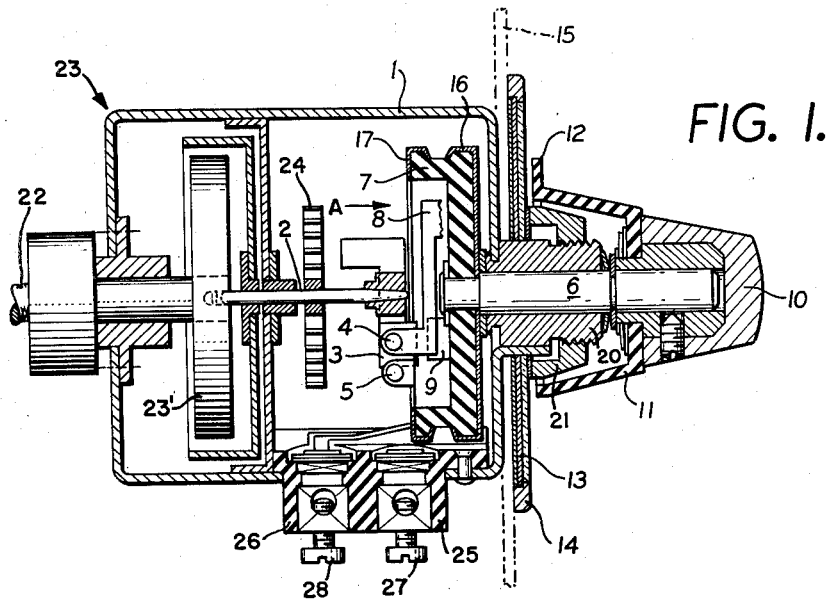
FIG. 1.
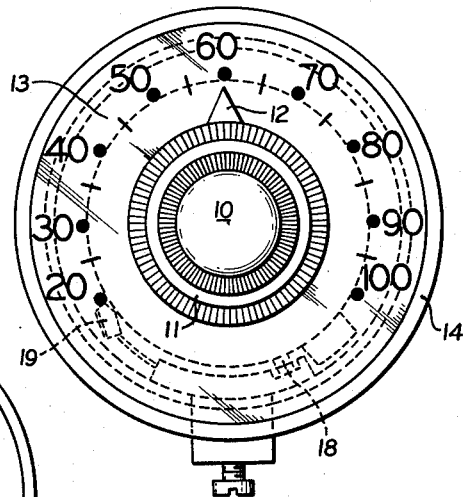
FIG. 2.
FIG. 3.
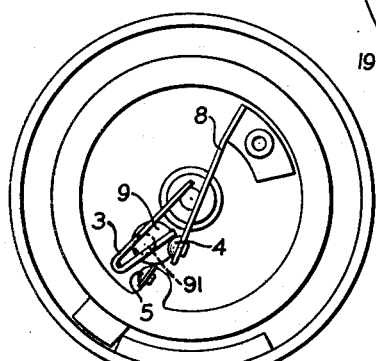
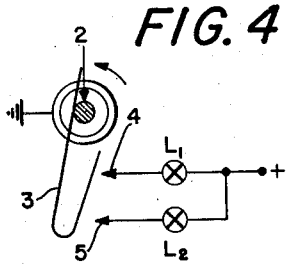
FIG. 4
INVENTOR
HEINRICH HENSS
BY
ATTORNEY.

United States Patent Office 3,059,230
Patented Oct. 16, 1962

3,059,230
SPEED WARNING DEVICE FOR MOTOR VEHICLES
Heinrich Henss, Frankfurt am Main, Germany, assignor to Fa. VDO Tachometer Werke Adolf Schindling G.m.b.H., Frankfurt am Main, Germany, a corporation of Germany
Filed Dec. 7, 1959, Ser. No. 857,893
Claims priority, application Germany Dec. 11, 1958
5 Claims. (Cl. 340—263)

The present invention relates to speed warning devices for motor vehicles.

Speed warning devices for motor vehicles have been proposed before in form of different structures. Such warning devices are in most instances built into the speedometer and may have also a speed setting operable from the outside, or into the drive shaft of the speedometer, or a member is attached to the gear drive of the vehicle, which member closes a warning circuit, for instance for an optical indicator at a predetermined adjustable speed. In the second stated instance it is, however, impossible to set on a dashboard a selective warning speed.

It is one object of the present invention to provide a speed warning device for motor vehicles which may be built into the dashboard in any motor vehicle, independently from the speedometer.

It is another object of the present invention to provide a speed warning device for motor vehicles which comprises substantially a known speed measuring system, for instance an eddy current system which is quite known, as a means for the setting of a terminal responsive to the speed. The counter terminal or contact is settable to the desired warning speed, in accordance with the present invention, by means of a manually operated member with a hand moving along a speed scale. This embodiment has the advantage, in addition to the general application for the different motor vehicle types, that the warning speed can be adjusted during movement of the vehicle to any selective speed values without interfering with the indication of the speedometer.

It is still another object of the present invention to provide a speed warning device for motor vehicles, wherein in addition to the contact for the warning speed, for instance the maximum speed provided by the authorities within a certain territory, still a second contact is provided designed to close a preliminary signal circuit.

It has been observed that a warning signal for the permitted maximum speed forces the driver to look continuously to the speedometer if he wishes to drive at a speed just below the maximum speed value. This is, however, in city traffic, where on the one hand the driver should not bo beyond the maximum speed of, for instance 25 miles per hour, and on the other hand, the driver should move close to this maximum speed in order to have an easy flow of the traffic quite close to said maximum speed, rather disturbing if not even dangerous. In accordance with the present invention, two counter-contacts are provided on the setting device for the set contact, the first counter-contact being spring-biased and the second counter-contact being rigidly secured, so that the contact set by the speed measuring system at first engages the spring-biased counter-contact and then after a predetermined speed increase, for instance of three miles per hour, engages the second and rigidly secured counter-contact. Upon engagement of the spring-biased first counter-contact, the preliminary signal circuit is closed and upon engaging the rigidly secured counter-contact, the actual warning signal circuit indicates the speed over which the driver should not go. The spring-biased counter-contact can be adjusted in its operative position relative to the rigidly secured second counter-contact by means of an eccentric within certain ranges.

This arrangement has the advantage that upon reaching a speed of, for instance, 30 miles per hour, a yellow light will be lit as a preliminary signal and upon reaching the maximum speed only, the red warning signal will light up. The driver thus does not have to observe the speedometer as long as the yellow signal is lit, and has the assurance that he is driving at speed which is close to the permitted maximum speed.

With these and other objects in view which will become apparent in the following detailed description, the present invention will be clearly understood in connection with the accompanying drawing, in which:

FIGURE 1 is an axial section of the device designed in accordance with the present invention and shown mounted on the dashboard, along the lines 1—1 of FIG. 3;

FIG. 2 is a front elevation of the setting knob;

FIG. 3 is an elevation of the contact setting device, seen in the direction of the arrow A in FIG. 1; and FIG. 4 is a circuit diagram indicating the circuit closings in the preliminary and the final warning positions.

Referring now to the drawing, the warning device comprises a housing 1 and a speed measuring system 23 disposed in the housing 1. A shaft 2 is rotatably mounted in the housing 1 and operated by means of the speed measuring system 23. A contact element 3 is secured to the shaft 2, the contact element 3 engaging a spring-biased counter-contact element 4, as well as an immovable counter-contact element 5, respectively, in the corresponding speed positions.

The speed measuring system is well known and, as shown in FIG. 1, an eddy current tachometer 23 driven by the flexible tachometer shaft 22 is provided in the housing 1. Upon turning of the flexible tachometer shaft 22, the shaft 2 turns in the center of the magnet 23' of the eddy current tachometer 23 over a larger or smaller angle against the force of a spiral spring 24 mounted on the shaft 2 due to the eddy current effect and the contact element 3 mounted on the shaft 2 is turned with the latter. The amount of the angular displacement of the shaft 2 and of the contact element 3 is, in known manner, responsive to the number of revolutions of the flexible tachometer shaft 22. The shaft 2 may be supported in any suitable manner, as by a bearing plate 1' in the housing 1.

The setting device for the counter-contact elements 4 and 5 comprises substantially a shaft 6 mounted in the housing 1, a disc 7 being secured to one end of the shaft 6 inside the housing 1 as a carrier for the counter-contact elements 4 and 5 which are suitably set on insulating material. The counter-contact element 4 is disposed on a spring blade 8 and its position relative to the immovable counter-contact element 5 is adjustable within predetermined limits by means of the eccentric or cam 9 which is turnable on the axle 9'. In this manner the speed difference at which the counter contact element 4 engages the adjustable contact element 3 prior to the engagement with the counter-contact element 5 may be set. A manually operated knob 10, 11, for instance a two-part rotary knob, is secured to the other end of the shaft 6 which extends through the dashboard 15.

The rotary knob comprises one part 10 which is rigidly secured to the shaft 6 and another part 11 which is rotatable upon the shaft 6, yet coupled to the latter by friction. The lower part 11 of the rotary knob carries the indicator 12. A scale disc 13 is secured behind the rotary knob to the dashboard 15 and covered by a transparent cover 14, which scale disc 13 can be reset, if required. In order to permit such resetting, the scale disc 13, as well as its cover 14 is secured to the dashboard 15 by means of a nut 21 screwed to the bushing 20. Only upon removal of the knobs 10 and 11 from the shaft 6, access is provided to the nut 21 and then only can the scale disc 13 be reset or exchanged with another disc.

The speed warning device can be mounted, in accordance with the present invention, at any selected place of the dashboard 15 and is operated, in the same manner as the speedometer, by means of a flexible shaft 22; for instance by means of an angular drive, which may be connected with the driving shaft for the speedometer. The two-part knob 10, 11 serves the purpose to set the indicator 12 on the speed scale. Upon mounting the device on the dashboard 15, the position of the indicator 12 will not coincide as a rule, upon lighting the red speed warning signal, with the speed indicator of the speedometer. In order to adjust the indicator 12, the vehicle is driven with a predetermined speed, for instance, 30 miles per hour, and the rotary knob 10, 11 and with the latter the counter-contact element 4, 5 are turned until the warning signal, for instance the red signal lamp, just lights up. Then the upper knob part 10 is retained in its position and the lower knob part 11 turned until the indicator 12 points to "30" on the speed scale. The position of the spring-biased counter-contact element 4 has been set previously to the desired speed distance for the preliminary signal by means of the eccentric or cam 9, so that the mileage difference between the yellow light signal and the red speed limit signal can be adjusted. After adjustment of the indicator 12, the warning speed may be set at any time to any selected value by means of the speed scale. If, with the increasing speed, the movable contact element 3 moved by the speed measuring system, engages the spring-biased counter-contact element 4, the preliminary warning signal, set for the mileage difference below the warning speed, indicates that the warning speed will be close.

The scale disc 13 is adjusted to the driving transmission of the speedometer, namely to the so-called number of revolutions of the wheels on the road, which scale disc 13 is the only part of the device which has to be accommodated to the different types of motor vehicles.

The carrier disc 7 has at its periphery two contact rings 16 and 17 insulated relative to each other and pressed on the disc 7, in order to provide electric connections for the counter-contact elements 4 and 5. The brushes 18 and 19 engaging the corresponding slide rings 16 and 17 complete the electrical connections for the two warning circuits. The feeding of electric current to the contact element 3 moved by the speed-measuring system is obtained by means of the shaft 2.

In the embodiment disclosed by example in the drawing, the terminals for the two warning circuits are shown as clamping connections 25 and 26 having screws 27 and 28, respectively. It may be of advantage, however, for instance in the case of lack of sufficient space, to provide the terminals as non-exchangeable plugs and sockets (not shown).

While I have disclosed several embodiments of the present invention, it is to be understood that these embodiments are given by example only and not in a limiting sense, the scope of the present invention being determined by the objects and the claims.

I claim:

1. A speed warning device for a motor vehicle having a dashboard and a speedometer for indicating the speed of said vehicle, comprising a measuring system forming a complete unit independent from said speedometer and including a first contact element movable in response to the speed of said vehicle, at least one second contact element, a disc bearing a scale mounted on said dashboard, manually operated means setting said second contact element in the assembled position of the latter selectively to any predetermined warning speed along said scale, and said manually operated means comprising at least two parts, one of said parts including an indicator riding along said scale, circuit means including said first and said second contact elements and signal means, said circuit means rendered operative upon engagement of said speed-responsive first contact element with said selectively set second contact element, said indicator being adjustable relative to the other of said parts of said manually operated means, and said scale being exchangeably mounted on said dashboard.

2. A speed warning device for a motor vehicle having a dashboard and a speedometer for indicating the speed of said vehicle, comprising a measuring system forming a complete unit independent from said speedometer and including a first contact element movable in response to the speed of said vehicle, at least one second contact element, a disc bearing a scale mounted on said dashboard, manually operated means setting said second contact element in the assembled position of the latter selectively to any predetermined warning speed along said scale, and said manually operated means comprising at least two parts, one of said parts including an indicator riding along said scale, circuit means including said first and said second contact elements and signal means, said circuit means rendered operative upon engagement of said speed-responsive first contact element with said selectively set second contact element, said indicator being adjustable relative to said manually operated means, and said scale being exchangeably mounted on said dashboard, said manually operated means including a shaft, rotatably mounted on said dashboard, and also a knob secured to said shaft for joint rotation therewith, a third contact element adjustably set in said measuring system at a point of said scale indicating a slightly lower speed on said scale than the setting of said second contact element, said third contact element being of resilient material, said third contact element and a second signal means disposed in said circuit means, so that upon engagement of said speed-responsive first contact element with said third contact element said second signal means is rendered operative.

3. The device, as set forth in claim 2, which includes a spring blade for securing said third contact element to said manually operated means, and a cam secured to said system for adjustment of the set speed difference of said third contact element relative to the set position of said second contact element.

4. The device, as set forth in claim 2, wherein said system includes a disc of insulating material, two contact rings are secured to said disc spaced apart from each other, said second contact element is disposed on one of said contact rings and said third contact element is disposed on the other of said contact rings, and a brush coordinated to and engaging each of said contact rings, said brushes connecting said third contact element and said second contact element, respectively, in said prewarning circuit and said warning circuit, respectively.

5. The device, as set forth in claim 2, wherein said knob member comprises two parts, said shaft extending axially through said knob member, one of said parts rigidly secured to said shaft and the other of said parts frictionally mounted on the one of said parts for rotation thereon and carrying said indicator, so that upon rotation of said shaft said second contact element may be set.

References Cited in the file of this patent

UNITED STATES PATENTS

| | | |
|---|---|---|
| 2,538,218 | Treese | Jan. 16, 1951 |
| 2,824,298 | Ross | Feb. 18, 1958 |
| 2,827,621 | Reichert et al. | Mar. 18, 1958 |
| 2,866,022 | Mininberg | Dec. 23, 1958 |
| 2,920,154 | Allen | Jan. 5, 1960 |